3,101,256
SEPARATION OF HYDROGEN ISOTOPES
Karl Erik O. Holmberg, Stockholm, Sweden, assignor to Quartz & Silice S.A., Paris, France, a corporation of France
Filed Aug. 28, 1958, Ser. No. 757,841
5 Claims. (Cl. 23—204)

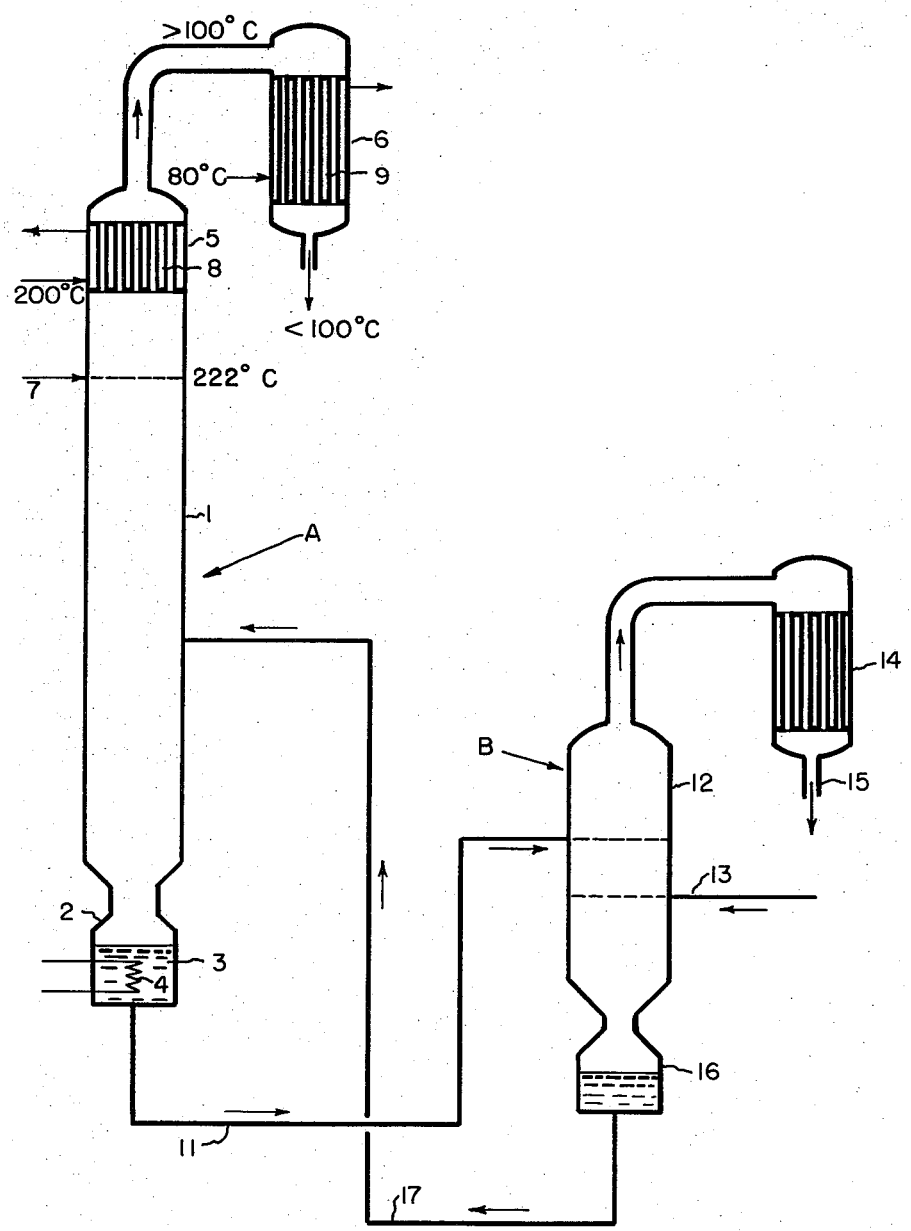

This invention relates to the separation of hydrogen isotopes and is directed primarily to the production of deuterium and deuterium compounds from natural sources of hydrogen.

The separation of deuterium from natural sources of hydrogen is of present importance largely because of the need for heavy water in nuclear reactions. The separation may be carried out by several processes, important ones being by electrolysis of water, by distillation of hydrogen compounds or of liquid hydrogen, and by isotope exchange processes. In the latter hydrogen or a compound of hydrogen containing both isotopes is brought into equilibrium with another compound which also contains both isotopes, but in a different proportion. By then separating the compounds a partial separation of the isotopes is effected, and by repeated processing higher degrees of separation may be made.

This invention provides an isotope separation process in which separation is partly achieved by distillation and partly by an isotope exchange equilibrium reaction. Insofar as the invention utilizes distillation to effect separation of hydrogen compounds of different isotope content it is based on the discovery that pyridinium chloride, that is the reaction product of equimolar amounts of pyridine (designated herein by the symbol Py) and hydrochloric acid, may be readily separated by distillation into species differentiated on the basis of the hydrogen isotope contained in the hydrogen chloride component. On simple distillation the distillate or vapor component is relatively enriched in light hydrogen, as PyHCl having a boiling point of 222.5° C., leaving the liquid phase relatively enriched in deuterium, as PyDCl having a boiling point of 226° C.

It should here be noted that the terms "distillation" and "fractionation" as applied herein to the separation of pyridinium chloride species of different hydrogen isotope content refer not only to the enrichment occasioned through the vapor-liquid equilibrium but also include an exchange reaction by virtue of the equilibrium between pyridinium chloride on the one side and pyridine plus hydrogen chloride on the other. In other words "boiling" pyridinium chloride results not only in the generation of pyridinium chloride vapors but also in a reversible decomposition of pyridinium chloride into pyridine and hydrogen chloride. The following reversible reaction is established:

$$PyHCl \rightleftharpoons Py + HCl$$

and $$PyDCl \rightleftharpoons Py + DCl$$

As a result enrichment of the liquid phase in the deuterium-containing species is further effected by the equilibrium reaction:

$$PyHCl + DCl \rightleftharpoons PyDCl + HCl$$

At the condenser, vapors of pyridinium chloride condense to the liquid phase and in addition pyridine vapors and gaseous hydrogen chloride recombine to form pyridinium chloride. For convenience reference is made herein to pyridinium chloride vapors and to the condensation of these vapors to liquid pyridinium chloride, but it should be understood that "vapors" includes free pyridine vapors and hydrogen chloride produced by dissociation and that "condensation" includes the recombining of the dissociation products to pyridinium chloride.

The process of this invention may be carried out simply by distilling pyridinium chloride, in which case the raw material for the process is natural pyridinium chloride, a mixture of PyHCl and PyDCl, and the heavy hydrogen product is the fraction enriched in PyDCl, from which the deuterium may be recovered by extracting the deuterium contained in the hydrogen chloride group. In its preferred embodiment, however, the pyridinium chloride is utilized as an intermediate product and an additional degree of separation is obtained by using water as the source of the isotope mixture and causing it to enter an isotope exchange reaction with the pyridinium chloride. In this preferred embodiment the water is introduced into the distillation column, and deuterium in the water is exchanged for hydrogen from both pyridinium chloride and hydrochloric acid. The pyridinium chloride thus becomes enriched in its deuterium-containing species through the additional equilibrium reaction:

$$PyHCl + HDO \rightleftharpoons PyDCl + H_2O$$

The water depleted of deuterium is then exhausted as vapor from the top of the distillation column and the deuterium-enriched fraction of the pyridinium chloride is removed from the bottom of the column. This fraction is then treated with water to undergo a second isotope exchange reaction in which its deuterium content is exchanged for light hydrogen from the water and a deuterium-enriched fraction of water is formed.

The process of this invention may be carried out in conventional distillation equipment which will include in general a still and a fractionating column of conventional design. The pyridinium chloride is conveniently introduced at an appropriate mid-point of the column as liquid or vapor, or a mixture of liquid and vapor. The deuterium-enriched fraction accumulates in the still at the bottom of the column and may there be recovered for further processing. Pyridinium chloride vapors generated in the still rise through the column in counter-current intimate contact with downflowing liquid pyridinum chloride reflux and are condensed at the top of the column as product enriched in the light hydrogen species of pyridinium chloride, part of which will be returned as reflux and part of which may be collected as deuterium depleted product. Effective separation of the two species may in this way be accomplished with a separation coefficient of 1.11 at atmospheric pressure. This coefficient compares very favorably with the separation factor of 1.026 realized when water is separated by distillation into the hydrogen isotope species. Even better separation may be effected by carrying out the distillation under reduced pressure. For instance at 150° C. a separation coefficient of 1.15 may be enjoyed.

By way of actual example, pyridinium chloride was separated on a laboratory scale by fractional distillation in a glass column three centimeters in diameter and one meter long, having a packing of Raschig rings. Fractionation was carried out to near equilibrium with the temperature of vapor at the top of the column maintained at 222° C. In this column, the theoretical number of plates was about 20, and an isotope enrichment coefficient of about 8 was attained. The light hydrogen-enriched pyridinium chloride was collected at the top and the deuterium-enriched pyridinium chloride was collected at the bottom of the column. By starting with an already enriched product containing 12 percent PyDCl, a heavy hydrogen product containing 50 percent PyDCl may be obtained at the boiler.

The high separation coefficient of pyridinium chloride minimizes the size requirements of the equipment, and thus represents a savings in the cost of a plant designed for a given separation. The energy required for distillation is relatively high, since the heat of vaporization is about 29,000 cal./mol, but the high boiling point of 222–226° C. makes it possible to recover most of the energy at a useful temperature level. It would be possible for instance to utilize the heat from the condenser in a pyridinium chloride system to operate a water distillation unit.

The preferred embodiment of this invention is described in detail below with reference to the accompanying drawing showing the apparatus schematically.

Apparatus preferably used for carrying out the process consists principally of pyridinium chloride distillation system designated generally as A, and an absorption system designated generally as B. The distillation unit A includes a fractionating column 1, such as a conventional bubble plate column, a still 2 at the base of the column provided with heating coils 4, a partial condenser 5 at the top of the column and a total condenser 6 which connects by a duct with the outlet of the partial condenser. A supply of pyridinium chloride 3 is boiled in the still and is totally condensed in the partial condenser 5 by a cooling medium maintained at a temperature of about 200° C. circulated through the cooling jacket 8.

As raw material, water containing both hydrogen isotopes is supplied by introducing steam superheated to a temperature of about 222° C. into the upper part of the column. The steam and pyridinium chloride depleted of deuterium enter into an exchange reaction whereby deuterium from the water is exchanged for light hydrogen from the pyridinium chloride to produce a corresponding amount of the deuterium species of pyridinium chloride. At the top of the column the pyridinium chloride vapors are totally condensed in the partial condenser 5 and are then passed as reflux down the column. The steam remains uncondensed, since the partial condenser 5 is operated at a temperature well above the boiling point of water, and passes to the total condenser 6 in which cold water, e.g. 80° C., is circulated through the cooling jacket 9. The condensed water depleted of deuterium is finally discharged from the condensate outlet of the total condenser 9.

The deuterium-enriched fraction of pyridinium chloride which accumulates in the still 2 is passed by a conduit to near the top of an absorption column 12 and water is introduced at a lower level through a conduit 13. The water vapor in the absorption column 12 enters an exchange reaction with the deuterium-enriched pyridinium chloride by which deuterium is exchanged for light hydrogen from the water, and these vapors are then passed upwardly into the condenser 14 and collected at the outlet 15 as a deuterium-enriched fraction of water. The pyridinium chloride within the absorption column collects in a flask 16 at the bottom of the column and from there is returned by conduit 17 to a mid-portion of the fractionating column 1.

The absorption column 12 is typically a conventional bubble plate or packed column in which downflowing liquid is brought into intimate countercurrent contact with an upflowing vapor or gas. In this column pyridinium chloride enriched in deuterium is contacted with raw water vapor to produce the deuterium-enriched fraction, which rises and passes to the condenser 14 while the pyridinium chloride flows downwardly.

Although this invention is described in detail with reference to its preferred embodiment, it is contemplated that obvious modifications will occur to those skilled in the art and familiar with this disclosure and that such may be made without departing from the scope of this invention.

Having thus disclosed my invention and described in detail a preferred embodiment thereof I claim and desire to secure by Letters Patent:

1. The method of separating hydrogen isotopes comprising fractionating pyridinium chloride containing both PyHCl and PyDCl by flowing liquid pyridinium chloride downwardly in a fractionating column while passing vapors of pyridinium chloride upwardly in said column, to produce a heavy fraction comprising pyridinium chloride enriched in deuterium present as PyDCl and a light fraction depleted in PyDCl, and recovering the heavy fraction.

2. The method of separating hydrogen isotopes comprising fractionating pyridinium chloride containing both PyHCl and PyDCl by flowing liquid pyridinium chloride downwardly in a fractionating column while passing vapors of pyridinium chloride upwardly in said column, to produce a heavy fraction enriched in PyDCl and a light fraction depleted in PyDCl, contacting the light fraction with natural water containing $H_2O$ and HDO to effect an exchange reaction between the HDO and the light fraction whereby said light fraction is enriched in PyDCl and said water is depleted of HDO, fractionating said PyDCl enriched light fraction to produce additional heavy fraction and light fraction, and removing deuterium from said heavy fraction.

3. The method of separating hydrogen isotopes comprising fractionating pyridinium chloride containing both PyHCl and PyDCl by flowing liqiud pyridinium chloride downwardly in a fractionating column while passing vapors of pyridinium chloride upwardly in said column, to produce a heavy fraction enriched in PyDCl and a light fraction depleted in PyDCl, contacting the light fraction with natural water containing $H_2O$ and HDO to effect an exchange reaction between the HDO and the light fraction whereby said light fraction is enriched in PyDCl and said water is depleted of HDO, fractionating said PyDCl enriched light fraction to produce additional heavy fraction and light fraction, contacting said heavy fraction with water containing $H_2O$ to effect an exchange reaction between the $H_2O$ and the heavy fraction whereby said water is enriched in HDO and said heavy fraction is depleted of PyDCl, and recovering said water enriched in HDO.

4. The method of producing heavy water comprising fractionating pyridinium chloride containing both PyHCl and PyDCl by flowing liquid pyridinium chloride downwardly in a fractionating column while passing vapors of pyridinium chloride upwardly in said column, whereby the upwardly flowing vapors become increasingly depleted of PyDCl at the top of said column and said downwardly flowing liquid becomes increasingly enriched in PyDCl at the bottom of said column, adding water vapor containing both $H_2O$ and HDO to said pyridinium chloride vapors relatively depleted of PyDCl to effect an exchange reaction whereby hydrogen in said vapors is exchanged for deuterium and said water vapor is depleted of HDO, condensing said pyridinium chloride vapors at the top of said column to produce additional liquid pyridinium chloride, separating said liquid pyridinium chloride from said water vapor depleted of HDO and flowing said liquid pyridinium chloride downwardly in said column, contacting pyridinium chloride relatively enriched with PyDCl with water containing $H_2O$ to effect an exchange reaction whereby $H_2O$ is converted to HDO to produce water enriched in HDO, and recovering said water enriched in HDO.

5. The method of producing heavy water comprising fractionating pyridinium chloride containing both PyHCl and PyDCl by flowing liquid pyridinium chloride downwardly in a fractionating column while passing vapors of pyridinium chloride upwardly in said column, whereby the upwardly flowing vapors become increasingly depleted of PyDCl at the top of said column and said downwardly flowing liquid becomes increasingly enriched in PyDCl at the bottom of said column, adding water vapor containing both $H_2O$ and HDO to said pyridinium chloride vapors relatively depleted of PyDCl to effect an exchange reaction whereby hydrogen in said vapors is exchanged for deuterium and said water vapor is depleted of HDO, condensing said pyridinium chloride vapors at the top of said column without condensing said water vapor to produce additional liquid pyridinium chloride and flowing said liquid downwardly in said column, thereby separating the pyridinium chloride from said water vapor after said exchange reaction, contacting pyridinium chloride relatively enriched with PyDCl with water containing $H_2O$ to effect an exchange reaction whereby $H_2O$ is converted to HDO to produce water enriched in HDO, and recovering said water enriched in HDO.

References Cited in the file of this patent

FOREIGN PATENTS 736,459  Great Britain _____ Sept. 7, 1955

OTHER REFERENCES

"Proceedings of the International Conference on Peaceful Uses of Atomic Energy," 1956, vol. 8, pages 384 and 401.

Lord et al.: "Journal of Chemical Physics," vol. 21, pages 166–167 (1953).

Stephenson: "Introduction to Nuclear Engineering," 1954, pages 309–310.